July 1, 1930. H. C. THOMPSON 1,769,320
AEROPLANE
Filed Feb. 19, 1929 3 Sheets-Sheet 2
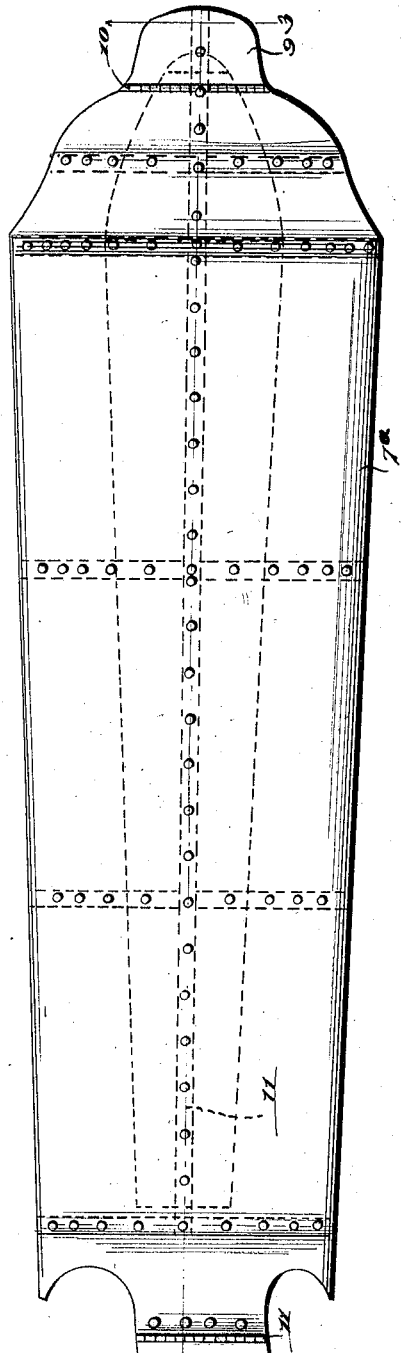
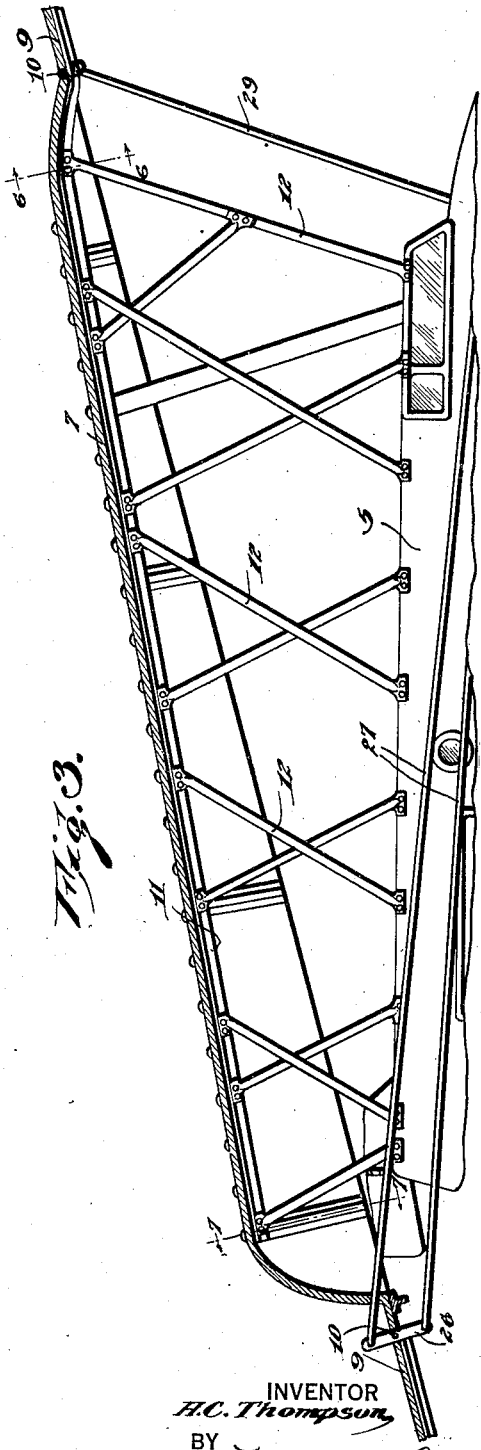
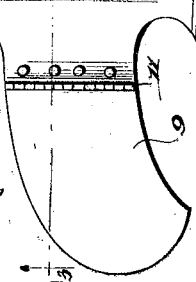

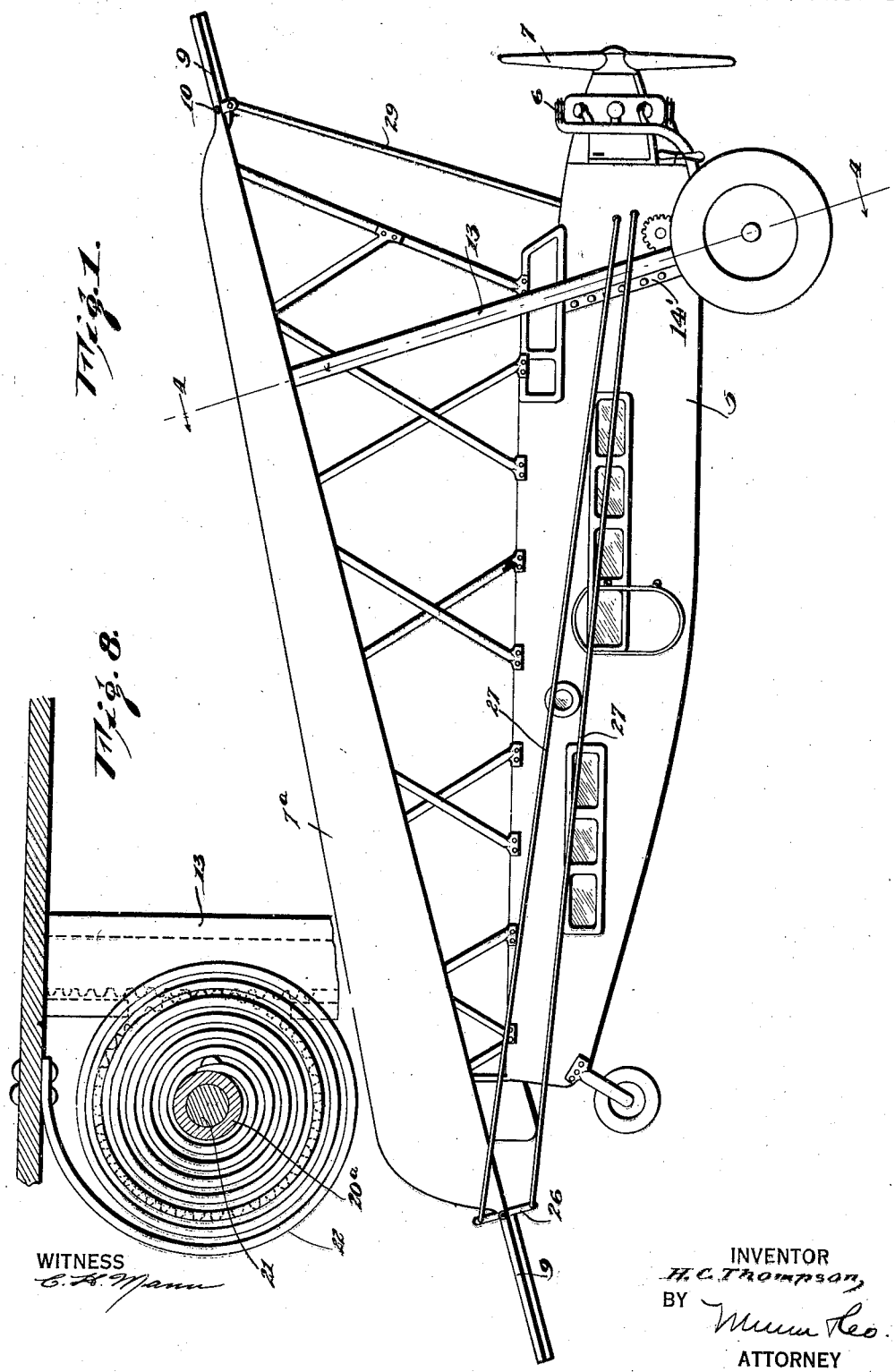

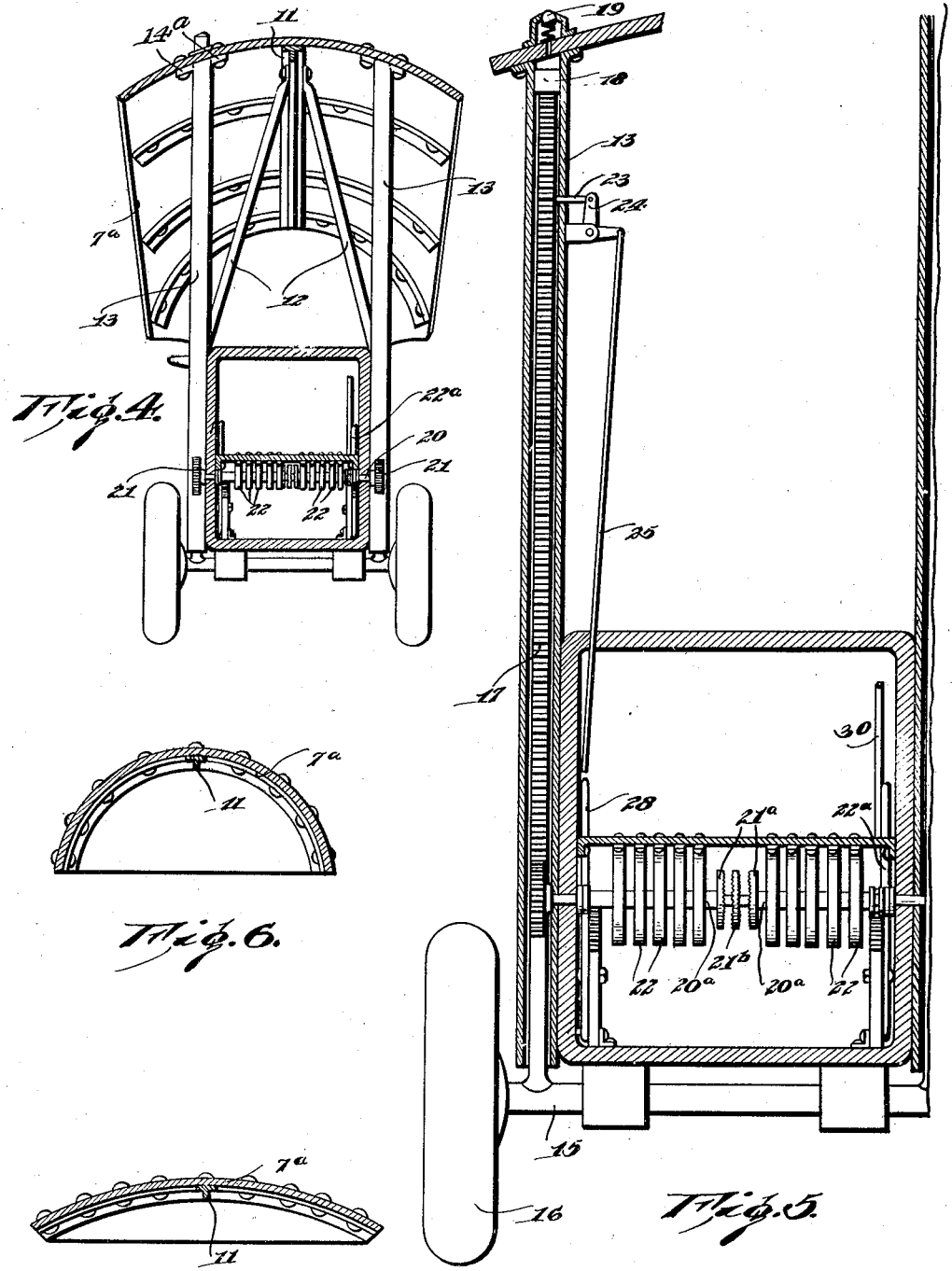

Patented July 1, 1930

1,769,320

UNITED STATES PATENT OFFICE

HENRY CLAY THOMPSON, OF OAKLAWN, LOUISIANA

AEROPLANE

Application filed February 19, 1929. Serial No. 341,140.

My invention relates to aeroplanes and has as one of its objects the provision of an aeroplane wherein the wing and load are so balanced as to cause the aeroplane to come out of a fall and glide safely to earth in the event its power plant becomes inoperative.

A further object of the invention is to provide an aeroplane having a single wing extending longitudinally of the fuselage at a sufficient height and angle to dispose the load forwardly, thus bringing the entire wing surface against the air resistance to stabilize the aeroplane in the event of mishap.

A further object of the invention is to provide an aeroplane having a retractable landing gear provided with shock absorbing means which are operative to permit the landing gear to have a maximum rebound without transmitting such rebound to the fuselage.

With the preceding and other objects and advantages in mind the invention consists in the novel combination of elements, constructions and arrangement of parts, and operations to be hereinafter specifically referred to, claimed and illustrated in the accompanying drawings, wherein;

Figure 1 is a side elevation of an aeroplane constructed according to my invention;

Fig. 2 is a top plan view of the same;

Fig. 3 is a longitudinal section taken on line 3—3 of Fig. 2;

Fig. 4 is a vertical sectional view taken on line 4—4 of Fig. 1;

Fig. 5 is a similar view taken on an enlarged scale and having parts broken away;

Fig. 6 is a transverse section taken on line 6—6 of Fig. 3; and

Fig. 7 is a similar view taken on line 7—7 of Fig. 3;

Fig. 8 is a vertical section taken on line 8—8 of Fig. 5 showing the parts on an enlarged scale.

Referring to the invention in detail a fuselage 5 having a motor 6 and propeller 7 at the front end thereof is provided. Extending longitudinally above the fuselage is a transversely bowed metallic wing 7ª whose longitudinal edges extend beyond the side walls of the fuselage. The wing 7ª is arranged at an angle with respect to the horizontal and has its forward end located at a considerable height above the forward end of the fuselage. A tip or aileron 9 is connected to each end of the wing 7ª by hinges 10.

In order to lend rigidity to the wing a longitudinally extending T-bar 11 extends substantially the entire length of the under face of the wing and is riveted or otherwise secured to the crest thereof. A plurality of arcuate ribs extend transversely of the under face of the wing to reinforce the same.

In order to connect the wing to the fuselage angularly disposed cross rods 12 are attached directly to the fuselage and to the T-bar 11. These cross bars 12 as particularly disclosed in Fig. 4 extend from the upper edges of the fuselage at opposite sides thereof in divergent relation and are connected directly to the T-bar.

With the wing arranged at an incline above the fuselage it will be seen that the center of gravity of the aeroplane is disposed forwardly. Thus should the aeroplane fall into a spin by reason of its power plant becoming inoperative the entire wing will be brought into play to resist the air pressure and thereby right the aeroplane and cause it to glide.

The invention also provides a retractable shock absorbing landing gear. For this purpose a pair of substantially rectangular casings 13 extend from the fuselage adjacent its forward end to the wing. These casings 13 are arranged at an angle in parallel relation at opposite sides of the fuselage. At their lower ends these casings are formed with attaching flanges 14 which are riveted or otherwise secured to the walls of the fuselage. At their upper ends these casings are formed with lateral ears 14ª which are also riveted to the under face of the wing. An axle 15 extends transversely across the fuselage below the housings and is equipped with ground engaging wheels 16. A pair of vertically extending rack bars 17 arise from the axle, each of which is received in one of the casings 15 for reciprocatory movement therein. A piston head 18 is formed on the upper end of each of the rack bars to cause air to be compressed therein upon vertical movement of the rack bars incident to the landing gear striking the ground. A spring pressed check valve 19 is provided in the upper end of each of the casings and is normally closed to the atmosphere. However, upon downward movement of the rack bars the check valve will be opened to the atmosphere to cause air to be drawn therein preparatory to the return movement of the piston.

Cooperating with the pistons 18 in absorbing the rebound of the landing gear is a spring shock absorbing mechanism consisting of a shaft 20 extending horizontally within the fuselage and journalled in the side walls of the latter. At the other end this shaft carries pinions 21 which mesh with the rack bars. A pair of sleeves 20$^a$ are rotatably mounted upon the shaft and having their inner ends spaced. Clutch discs 21$^a$ are carried by the inner ends of these sleeves and are adapted to engage a double faced clutch disc 21$^b$ which is slidably mounted on the shaft 20. One of the sleeves is shiftable longitudinally on the shaft by a hand lever 22$^a$. Thus upon shifting the hand lever 22$^a$ in one direction the clutch disc will be engaged to operatively connect the sleeves with the shaft 20. A plurality of helically wound coiled springs 22 encircle the sleeves 20$^a$ and have their inner ends secured thereto, while their opposite ends are secured to a cross member 23 supported within the fuselage above the shaft. These springs are normally contracted so that upon downward movement of the rack bars preparatory to landing these springs will be coiled or wound upon themselves through the medium of the gears 21 to resist the blow imparted to the rack bars when the wheels 16 strike the ground.

Normally the rack bars are held in raised or retracted position by means of a manually releasable latch element 23 projecting into the upper end of one of the casings 13 and engaging the rack bar therein. In landing these latch elements will be released to permit the rack bars and landing gears to move to lowered position. As disclosed in Fig. 5 the latch element is slidable transversely of the casing and is pivotally attached to a bell crank lever 24 supported at one side of the casing. An actuating rod 25 depends from the bell crank lever and extends to a point within reach of the operator. Normally the springs are coiled or partially wound so that upon lowering of the rack bars and landing gear they will be fully unwound or expanded. It therefore follows when the landing gear strikes the ground pinions 21 will be driven in a direction to wind the springs about the shaft 20 and thereby resist the upward movement of the rack bars. Also incident to the upward movement of the rack bars the pistons 18 will be resisted by air pressure within the casing and thus cooperate with the springs in cushioning the landing of the aeroplane.

The rear tip or aileron is equipped with an arm 26 with which control cables 27 are connected. These cables extend longitudinally of the fuselage and are operatively connected with a hand lever 28 pivotally supported within the fuselage. The front tip or aileron is controlled by an actuating rod 29 which is operatively connected with a suitable hand lever 30.

What is claimed is:

In an aeroplane, a fuselage, a wing arranged at an incline above the latter and extending longitudinally thereof, a longitudinally extending flange arranged upon the inner face of the wing at the longitudinal center of the latter, and crossed rods having their lower ends attached to opposite sides of the fuselage and their upper ends attached to the flange.

H. C. THOMPSON.